United States Patent [19]
Wicklund

[11] Patent Number: 6,154,459
[45] Date of Patent: *Nov. 28, 2000

[54] DATA SHAPER FOR ATM TRAFFIC

[75] Inventor: Göran Wicklund, Nacka, Sweden

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/893,576

[22] Filed: Jul. 11, 1997

[51] Int. Cl.$^7$ .................................................. H04L 12/28
[52] U.S. Cl. .......................................... 370/395; 370/397
[58] Field of Search .................................... 370/218, 231, 370/233, 395, 397, 412, 418, 230; 340/825.51

[56] References Cited

U.S. PATENT DOCUMENTS

| | | |
|---|---|---|
| 5,339,318 | 8/1994 | Tamaka et al. . |
| 5,367,520 | 11/1994 | Cordell . |
| 5,414,701 | 5/1995 | Shtayer et al. . |
| 5,418,786 | 5/1995 | Loyer et al. . |
| 5,420,858 | 5/1995 | Marshall et al. . |
| 5,440,552 | 8/1995 | Sugita . |
| 5,455,825 | 10/1995 | Lauer et al. . |
| 5,467,349 | 11/1995 | Huey et al. . |
| 5,481,687 | 1/1996 | Goubert et al. . |
| 5,483,526 | 1/1996 | Ben-Num et al. . |
| 5,504,743 | 4/1996 | Drefenstedt . |
| 5,515,359 | 5/1996 | Zheng . |
| 5,521,917 | 5/1996 | Watanabe et al. . |
| 5,530,698 | 6/1996 | Kozaki et al. . |
| 5,530,806 | 6/1996 | Condon et al. . |
| 5,535,201 | 7/1996 | Zheng ..................................... 370/231 |
| 5,546,377 | 8/1996 | Ozveren . |
| 5,555,256 | 9/1996 | Calamvokis . |
| 5,572,522 | 11/1996 | Calamvokis et al. . |
| 5,579,302 | 11/1996 | Banks ........................................ 370/17 |
| 5,579,312 | 11/1996 | Regache ................................ 370/60.1 |
| 5,818,815 | 10/1998 | Carpentier ............................... 370/218 |
| 5,844,890 | 12/1998 | Delp et al. ............................... 370/230 |

FOREIGN PATENT DOCUMENTS 0 690 596  1/1996  European Pat. Off. .
2 301 913  12/1996  United Kingdom .

OTHER PUBLICATIONS

Uyless Black, "ATM Foundation For Broadband Networks", Prentice Hall PTR, pp. 375 and 376, 1993.
IBM Technical Disclosure Bulletin, vol. 35, No. 3, "Connectionless ATM Network Support Using Virtual Path Connections," pp. 445–448, Aug. 1992.
IBM Technical Disclosure Bulletin, vol. 36, No. 1, "Combined Translation Lookaside Buffer for Page Frame Table and Translation Control Word Entries," pp. 240–242, Jan. 1993.
IBM Technical Disclosure Bulletin, vol. 38, No. 11, "Fast Technological Update in Asynchronous Transfer Mode Networks," pp. 359–360, Nov. 1995.
IBM Technical Disclosure Bulletin, vol. 39, No. 1, "Method for High–Speed Swapping of Asynchronous Transfer Mode Virtual Path Identifier/Virtual Channel Identifier Headers," pp. 225–228, Jan. 1996.
PCT International Preliminary Examination Report, Oct., 1999, 14 pgs.
Saito, et al., "Traffic Control Technologies in ATM Networks," IEICE Transactions, vol. E74, No. 4, Apr. 1991, pp. 761–771.

*Primary Examiner*—Huy D. Vu
*Assistant Examiner*—Alexander Boakye
*Attorney, Agent, or Firm*—Nixon & Vanderhye P.C.

[57] ABSTRACT

A method and apparatus for prioritizing ATM cells within time transmission slots is disclosed. The present invention takes cells which have been prioritized by traditional priority circuitry and adds to them information regarding the need to begin transmitting cells in the current time slot in order to ensure that a list of cells which must be transmitted by a future time slot can all be transmitted timely. If no list of cells in a future time slot mandate immediately transmission in the current time slot, a cell from the standard prioritization buffer will be transmitted. If, on the other hand, a subsequent slot contains so many entries that one of its cells must be transmitted in the current slot in order to ensure that all cells in the list are transmitted before their time deadline, one of the cells from the subsequent time slot list will be transmitted in lieu of the standard priority cell of the current slot.

27 Claims, 10 Drawing Sheets

DATA SHAPER FOR ATM TRAFFIC

This application is related to the following (all of which are incorporated herein by reference): U.S. Pat. application Ser. No. 08/393,391 (attorney docket: 1410-321), entitled "VC MERGING FOR ATM SWITCH", filed Jul. 11, 1997; U.S. Pat. application Ser. No. 08/891,232 (attorney docket: 1410-322), entitled "ABR SERVER", filed Jul. 11, 1997; U.S. Pat. application Ser. No. 08/890,758 (attorney docket: 1410-323), entitled "HANDLING ATM MULTICAST CELLS", filed Jul. 11, 1997; and U.S. Pat. application Ser. No. 08/893,479 (attorney docket: 1410-326), entitled "VP/VC LOOK-UP FUNCTION", filed Jul. 11, 1997.

FIELD OF THE INVENTION

This invention relates to ATM switching networks, and more particularly to the shaping of ATM traffic in which each connection is shaped in accordance with parameters such as its Peak Cell Rate and Sustainable Cell Rate.

BACKGROUND OF THE INVENTION

Digital data is transmitted from one user to another user via a switched network usually in the form of data packets. In one standard method of transmitting digital data, the data packets are switched through the network via virtual channels. The virtual channels are prepared as a result of a server routing the packets through the switched network via a path that has been determined by the server to satisfy the data traffic requirements for the particular data being transmitted. This type of a system is referred to as an asynchronous transfer mode network (ATM).

In ATM networks, data is packeted by the user application into blocks of data referred to as "cells." Each cell is a portion of data to be transmitted from one user application to another user application via the ATM switched network. The ATM network, through a series of ATM switches, provides a connection through which a user application may communicate cells to another user application. Each connection is characterized by a peak cell rate, which refers to the maximum number of cells that can be transmitted across a given connection per unit time. The ATM connections can also be characterized by a "sustainable cell rate," which refers to the cell rate that can be sustained over longer transmission durations, rather than the shorter, burstier transmissions that characterize the "peak cell rate." Those of ordinary skill in the art will understand the "peak cell rate" and the "sustainable cell rate," as these phrases are used to characterize ATM connections.

Although ATM networks can take a variety of different forms, they are generally characterized by interconnected routers and other associated hardware to switch data packets provided to the network from one point in the network to another point in the network. Within each ATM switch in the ATM network, data packets are provided via an ingress port, through the switch, and to an egress port. The data packets provided to each ingress port may have associated headers which indicate the routing, i.e., the virtual channel connections, through which the data is to travel within the ATM switched network. In this way, the data cells provided to an ingress port are switched through the associated ATM switch to an egress port, and ultimately from switch to switch through the ATM network.

Those of ordinary skill in the art will understand that packets traveling through an ATM switch must be prioritized for distribution. That is, an ATM network has, for each possible connection within it, limited sustainable cell rates for the transmission of packets. If a multiple number of user applications are providing packets to the ATM switched network for transmission over a particular connection, the cells being provided to it must determine which cells will travel first down a particular connection. Such prioritization of incoming data cells is referred to as "queuing."

A number of different methods have been provided for queuing cells through an ATM switched network, including queuing them based on a first-in prioritization scheme. Unfortunately, these schemes do not take into account the relative importance of the different cells within different transmission slots.

SUMMARY OF THE INVENTION

The present invention provides a method of prioritizing cells within a plurality of transmission slots, such that higher priority cells are transmitted first. The present invention takes into account that cells in future time slots may have to be transmitted in earlier time slots in order to ensure that all cells which are highly prioritized get transmitted before their time deadline.

The present invention thus views the time slots for ATM transmission as a series of slots within a window of time. The window is of constant length, such that when a cell from one slot is transmitted, another slot is added to the end of the window in order to maintain the same number of slots within the window length. Within each slot, the cell to be transmitted during that time slot is identified and prioritized among a group of cells, together with a list of cells from future time slots that may need to be transmitted into current time slots. That is, the list within each time slot may preempt the prioritized cells within the current time slot, thus bumping the current cell in favor of cells located in future slots.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which:

FIG. 8a shows example pointers in a priority queue;

FIG. 8b shows example pointers in a best-before list;

FIG. 8c shows example pointers in a list of best-before lists; and

FIG. 8d shows example pointers in a group queue.

DETAILED DESCRIPTION OF THE PRESENTLY PREFERRED EMBODIMENT

Figure 1:
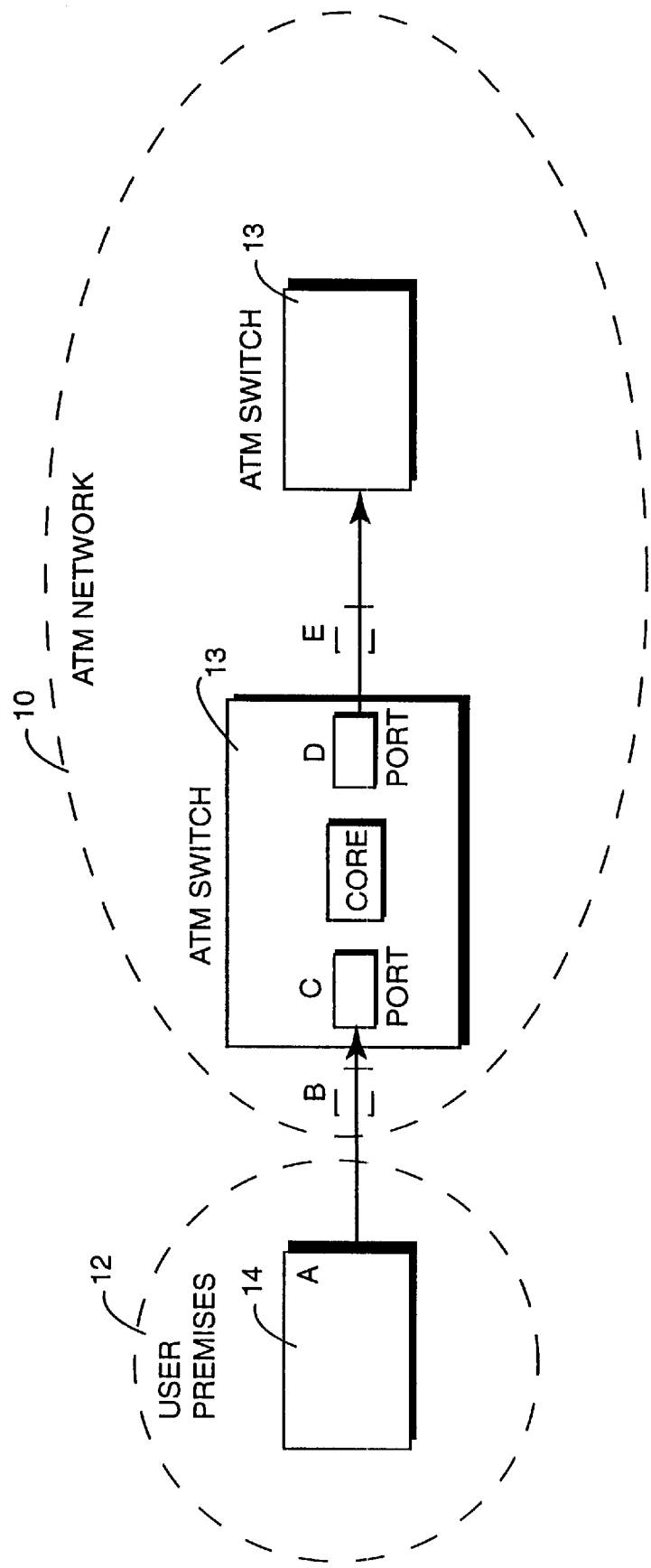
FIG. 1 is a schematic diagram of an ATM switched network system indicating potential positions for a shaper according to the present invention.

In FIG. 1, an ATM network 10 is shown communicating with a user application on a user premises 12. The ATM network 10 is comprised of a number of ATM switches 13, each of which defines an ingress port and an egress port for data being provided to it from either the user premises 12 via application 14 or by another ATM switch 13. The present invention provides a shaper, which prioritizes data cells traveling through a particular ATM switch. FIG. 1 illustrates the potential places where the shaper may be located vis-a-vis the user premises 12 and the ATM network 10. Specifically, the present shaper can be located within the user equipment (position A), for example, in the application 14. Alternatively, the shaper may be associated with a particular ATM switch. For example, the shaper may be located as a separate unit (position B) just ahead of the ingress port of an ATM switch 13. Alternatively, the shaper may be located as a separate piece of equipment just behind the egress port of the ATM switch 13. Still alternatively, the shaper can be located within the ingress port equipment (position C) or the egress port equipment (position D). In any of these cases, the shaper reads data cells proceeding through a connection of the ATM network and prioritizes the cells for transmission.

Figure 2:
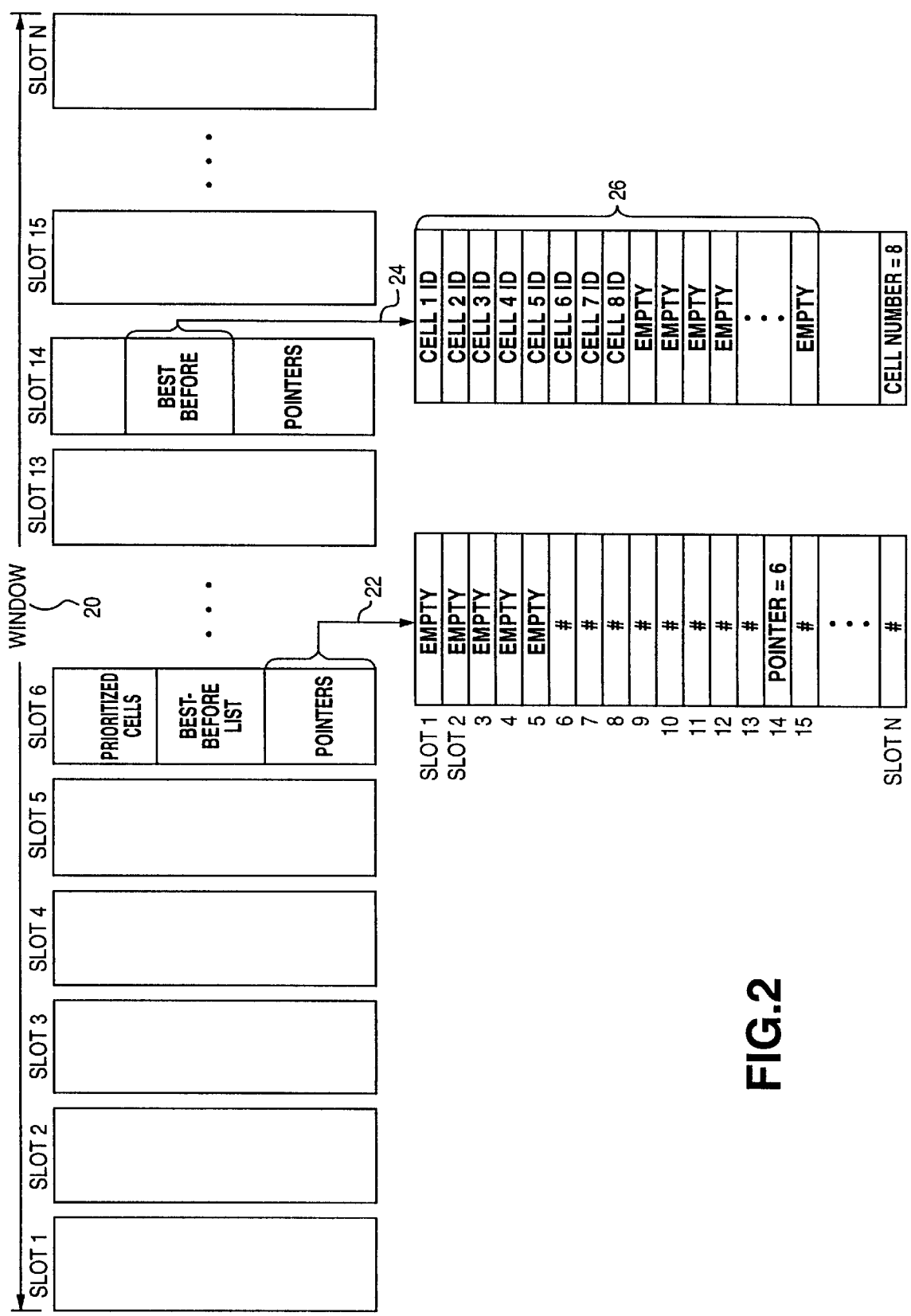
FIG. 2 is a schematic diagram of the data structures for the cell slots according to one example embodiment of the present invention.

FIG. 2 illustrates the data structure for an example embodiment according to the present invention. Shown in FIG. 2 is a window 20 of slots (slot 1, slot 2, slot 3, . . . , slot n). Each slot indicates a portion of time during which the ATM switched network 10 provides a user application with the opportunity to transmit one data cell. A data frame is then defined as being comprised of a number of data cells. In this sense, the present invention is not limited to a particular cell structure, but may be any data packet (or multiple data packet) type of cell.

As shown in FIG. 2, window 20 includes slot 1 on the far left side of FIG. 2, which is the current slot for transmission onto the ATM switched network 10. That is, during the next transmission cycle, the information identified in slot 1 for immediate transmission will next be transmitted. Then, the information identified in slot 2 will be transmitted, followed by slot 3, and so forth. Traditionally, the slots (slot 1, slot 2, etc.) would contain a single cell of prioritized information for transmission.

In the present embodiment of the invention, however, slot 1 contains information which will direct hardware or software to select one of two different types of identified cells in the slot. The first type of cells in slot 1 is the standard prioritized type of cell that may be contained in slot 1 individually, or in some sort of a queuing arrangement. The second type of cell which may be selected for transmission during slot 1 (in lieu of the first type of cell) is a cell from a so-called "best-before" cell list. The best-before lists and memory buffers of FIG. 2 are composed of a dedicated memory area with a fixed size. This is shown in this manner to highlight certain aspects of the invention and is not the preferred method of memory usage since it yields a high amount of empty, unused memory. Alternatively, the information above contained in the buffers can be stored or, even more preferable linked, without providing empty buffers, as described with respect to later embodiments.

Figure 4:
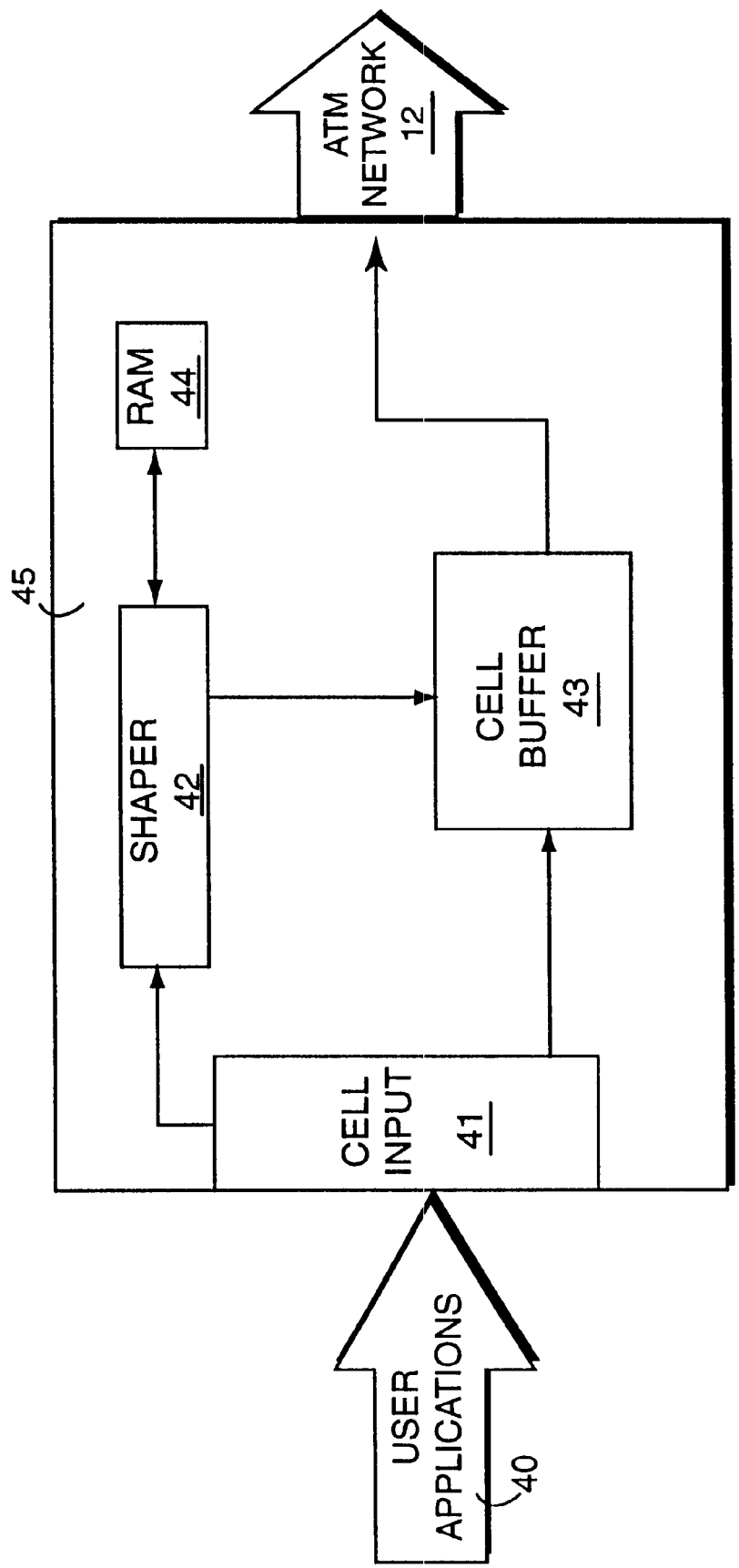
FIG. 4 is a schematic diagram of an example embodiment of the hardware of the present invention.

An example "best-before" list is shown in FIG. 2 for slot 14. As shown for this slot, the best-before list 24 includes a set of buffers 26 which preferably contain cell identifiers (or alternatively, the cell data itself), which can be used to find the appropriate cell data in another buffer. An example of such an apparatus is shown in FIG. 4, where data cells from user applications 40 are provided to a cell input 41 of a server 45 (or alternatively a distributed or centralized hardware or software element). The cell input 41 is provided to the shaper 42 which creates the slot information shown in FIG. 2 in a manner described in the following paragraphs. The shaper 42 uses RAM 44 to temporarily store slot information, including the prioritized cells, best-before lists, and pointers, described below. Typically, the shaper 42 does not include cell data information per se, but uses only buffer addresses to simplify operations. The actual cell data is provided in a cell buffer 43, which receives it from the cell input 41. The shaper 42 provides a cell address for a particular slot being transmitted, the cell buffer 43 uses the address to find the cell data itself, and then the cell buffer 43 provides the cell data to the ATM network 12.

Returning to FIG. 2, the best-before list 24 in slot 14 is shown with eight cell identifiers. These eight cell identifiers are located in the buffer 26, with all remaining address positions of the buffer 26 being empty. The total number of non-empty locations in the buffer 26 is indicated in a cell number position in the best-before list, in this case the cell number equals 8 since eight cells are non-empty. The best-before list 24 of slot 14 indicates that the eight cells identified in the buffer 26 must be transmitted on or before slot 14. With just this information, it is clear that the eight cells identified in the buffer 26 of the best-before list of the slot 14 must begin transmission by slot number 6 in order to ensure that the eight cells are all transmitted on or before slot 14 (14[slot number to finish transmitting]–8[cells to be transmitted at one cell per slot]=6[slot number to begin transmitting]).

Since the information in the best-before list 24 (that eight cells must be transmitted before slot 14) is known only to slot 14, the present invention includes a list to provide the earlier slots with the knowledge that eight cells exist in slot 14. This permits the earlier slots to prioritize the eight cells in buffer 26 of slot 14 before the transmission of slots progresses too far along to ensure that all eight cells get transmitted before their best-before slot at slot 14. To do this, the present invention includes a pointers list 22 within each of the slots in the window 20. An example pointers list 22 is shown in FIG. 2 with respect to slot number 6. The pointers list includes a number (i.e., a pointer) for every slot further in time within the window 20. That is, for slot 6, every slot from number 6 and afterward through slot N within the window 20 will contain a non-empty number within an associated buffer position in the pointers list 22. The pointers list 22 shown in FIG. 2 for slot 6 thus has empty information in slot positions 1–5 and then has non-empty numbers in the buffer positions for slots 6 through N. Also shown in FIG. 2 is the actual pointer for the situation shown with respect to slot 14. That is, the pointers list 22 includes a pointer equal to six in slot number 14 buffer. This tells slot 6 that it must begin transmitting cells from cell buffer 26 in order to empty the cell buffer before the best-before list deadline.

Assuming slots 1–5 transmit their cells without transmitting any of the cells in the slot 14 best-before list, then slot 6 becomes slot 1 and must begin transmitting one of the cells in buffer 26 in order to ensure that each of the cells in buffer 26 is transmitted before their best-before deadline of slot 14. In most cases, however, slots 1–5 may transmit one or more of the cells 1–8 in cell buffer 26 before slot 6 arrives. In this case, the transmitted cell would be removed from the cell buffer 26, the cell number in the best-before list of slot 14 will be reduced by 1 (i.e., will be reduced from 8 to 7), and the pointer for slot 14 in the pointer list 22 of slot 6 will be moved to slot 7 (i.e., from 6 to 7) thus indicating that slot 7 (not slot 6) needs to begin transmitting a cell from the buffer list 26 in order to ensure that all the cells in the list 26 are transmitted before their best-before deadline of slot 14.

As one can see from a study of FIG. 2, earlier slots can be made aware of the need to transmit cells that are contained in future slots in order to ensure that the cells in future slots get transmitted before their time deadlines. Of course, if the pointer list 22 of a current slot does not mandate the transmission of a cell in a subsequent best-before list 24, a cell from the prioritized cells in the current slot can be transmitted in lieu of one from a subsequent best-before Est. This will be described in greater detail with respect to FIG. 3.

Figure 3:
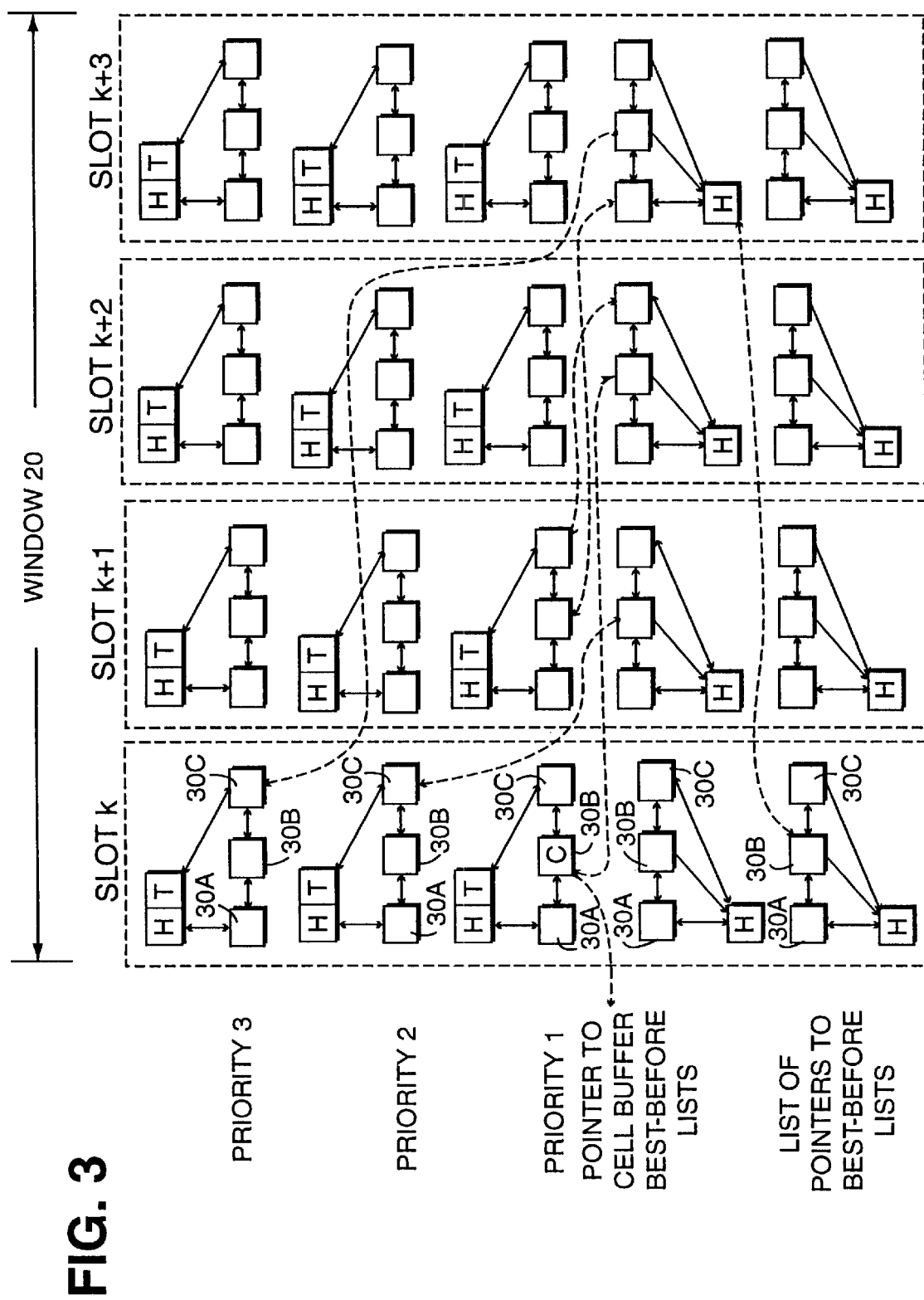
FIG. 3 is an example embodiment of a window of cell slots at an example moment in time according to the present invention.

The shaper 42 can contain the data structure shown in FIG. 3. A time window 20 of a fixed size is defined. This window represents the time from the current cell slot up to a cell slot N in the future. As an example, FIG. 3 shows four slots in the window. Each cell interval, this window is moved forward one step, so that it includes another sequential cell slot.

To each cell slot in the window, a number of queues are associated. These queues contain pointers to the cells that contend for transmission during a current slot. The queues are ordered in priority, so that a cell is taken from the highest priority, non-empty queue. When a cell is being transmitted, an earliest new time for transmitting a cell for this connection is calculated, based on the traffic parameters of that connection. These parameters are the peak cell rate, sustainable cell rate and burst size. An example formula for computing the earliest new time for transmitting is as follows:

$$earliest\_time = max\ (A + T_{SCR} - tau_{SCR} + PHI,\ previous\_time + T_{PCR})$$

where:

A is a variable that is updated after each cell: $A = A + T_{SCR}$ (A is individual per connection)

previous_time is the time when the previous cell of this connection was transmitted.

PHI is an accumulated phase shift. Updated after each cell of this connection: $PHI = PHI + MAX\ (0,\ previous\_time - A)$ These are parameters per connection (written by the micro-processor):

$T_{SCR}$ = time between two cells sent with sustainable cell rate $tau_{SCR}$ = acceptable deviation from ideal time for SCR (gives the maximum burst size)

$T_{PCR}$ = time between two cells sent with peak cell rate.

These parameters are also used for calculating a "best-before" cell slot, when the cell has to have been transmitted in order to fulfill the requirement on sustainable cell rate (this could be interpreted as a minimum cell rate for the connection). An example formula for this is:

$$best\_before = A + T_{SCR}$$

In FIG. 3, an embodiment of the present invention is shown in which four slots are provided within each window 20. Each slot (slot k, slot k+1, slot k+2, and slot k+3) is provided with three priority buffers for cells to be transmitted during that slot. Thus, each slot (for example, slot k) has a particular queue, such as priority 1, priority 2, and priority 3. With this queue, priority 1 cells are obviously transmitted ahead of priority 2, which are transmitted ahead of priority 3. Also within each priority buffer, a certain number of cells may be further queued. For example, in slot k, three cell buffers (30a–30c) are provided for each of the priority 1, priority 2, and priority 3 areas. Within the priority 1, priority 2, and priority 3 areas and within their respective buffers 30a–30c are all of the cells that have been allocated to slot k for transmission in slot k, by the user application, server, or other hardware or software providing prioritization functionality. Of the cells in the 30a–30c positions of priority 1—priority 3, one cell may be transmitted during slot k. Thus, once a cell is selected for transmission in slot k, the remaining untransmitted cells are moved to subsequent slot positions (slot k+1, slot k+2, etc.). Thus, the cells in priority 1, priority 2, and priority 3 areas are transmitted in order of priority from the highest priority cell to the lowest.

The priority cells, however, may be preempted in transmission by the best-before lists and list of pointers aspects of the present invention. Thus, for example, in slot k of FIG. 3, the cell Ac in the priority 1 area (buffer 30b) may only be sent to the cell buffer 43 for transmission onto the ATM network 12 if no other cells in the best-before lists or lists of pointers section of slot k bump cell Ac from such transmission. Cell c is eligible for this bumping because cell c is linked to the best-before list of slot k+2, as shown in FIG. 3, thus mandating that cell c be transmitted by slot k+2, not necessarily in the present slot k (or in slot k+1). The best-before lists and lists of points in each slot shown in FIG. 3 are as described with respect to FIG. 2. Thus, if the best-before list of slot k contains a cell (that is, buffers 30a–30c in the best-before list of slot k are non-empty), that cell will be transmitted during slot k. If the best-before list of slot k is empty, the List of Pointers section of slot k is consulted to determine whether the transmission of cells in a subsequent best-before list must begin in slot k in order to ensure that those cells are transmitted before their best-before deadline. As shown in FIG. 3, for example, the list of pointers 30b in slot k is linked to slot k+3. If slot k+3 has a best-before list containing four cell entries, slot k, k+1, k+2 and k+3 will all be used to transmit those four entries in order to ensure that they are transmitted before their best-before deadline.

In FIG. 3, buffers marked "H" are for head pointers to a linked list; buffer marked "C" are for cells; and buffers marked "T" are for tail pointers to linked lists. Dashed lines represent implicit relationships between entries, such as an entry in a Table being part of two different linked lists.

Further, cell c in area 30b of priority 1 of slot k must be transmitted before slot k+2 and the cell in area 30c of priority 3 in slot k must be transmitted before slot k+3 in the example shown in FIG. 3.

As can be seen from studying FIG. 3, the transmission of cells in each slot is based not only on the prioritization of cells normally provided by priority hardware or software, but also on the best-before lists and list of pointers provided within each slot. Note also that the list of pointers of slot k is bidirectionally linked to slot k+3 in order to ensure that the list of pointers in slot k can retrieve a cell entry from the best-before lists of slot k+3 should the best-before list of slot k+3 contain more than three cell entries.

As shown in FIG. 3, the operation of the prioritization shaper of the present invention performs the following steps: first for a given current slot, the list of pointers section is checked to determine whether any subsequent best-before lists contain so many entries that transmission must begin in the current slot in order to ensure that the cells in that best-before list are transmitted before their best-before deadline. If the list of pointers in the current slot does not indicate such a condition, the best-before list in the current slot is consulted to determine whether it is full or empty. If it is full, the cell remaining in the best-before list of the current slot is transmitted. If it is empty, the cell which is most highly prioritized in the priority 1 through priority 3 buffer areas is transmitted, with the remaining cells in the priority 1-priority 3 areas being moved into subsequent time slots.

As described above, a best-before list exists for each slot in the window. Thus, when a cell is inserted in a queue at its earliest possible slot, it can have an implicit relationship (i.e., a dashed line) with other lists in other slots.

As shown in FIGS. 2 and 3, a List of Pointers also exists for each slot in the window. This list contains pointers to all best-before lists further down the window, whose length is equal to the difference between the two slots. The slot at which a pointer is stored, is called the start slot for the best-before list. In the example of FIG. 2, the slot 14 has a best-before list with 8 entries. A bidirectional link such as exemplified in FIG. 3 should then be set between this list and an entry in the list at position 6, as shown in FIG. 2.

When a cell arrives to the shaper, it is put in a virtual channel (per-VC) queue. If this cell is the first in the queue, a pointer to it is placed into the queues in the time window as described previously. If this cell was not the first in the queue, then a cell belonging to this connection in the time window queues must already exist. Only one cell from each connection may be present in the time window queues.

When a cell is transmitted from a time window queue, a pointer to the next cell for that connection is inserted. The cell should be inserted at the front of the queue, i.e., push the existing cells downwards in time.

When a cell is transmitted, the corresponding entry in a best-before list is removed. The length of this best-before list will thus decrease, which means that the start slot for it must be moved one slot forward.

When a cell has been transmitted, the remaining queues at that cell slot are concatenated with the queues for the next slot. The concatenation is made so that a moved queue is put in front of the queue with the same priority in the next slot, i.e., it is given precedence to the cells in the next slot. This is reasonable, as the moved cells have missed their earliest slot, and are one slot closer to their best-before slot.

A cell is normally taken from the highest priority, non-empty queue at a slot. However, if the list of pointers to best-before lists is not empty, it means that from this slot up to a slot some distance, d, further down, there are at least d cells that have to be transmitted before that time otherwise they will miss their best-before slot. In that case, cells are taken from the best-before list pointed by the entry in the current time slot. When such a cell is taken out, the corresponding entry in a normal window queue is removed.

On occasion, more than one pointer may exist to a best-before list in the current time slot. In such a case, it is unfortunately not possible to send out all cells before their best-before slot. In these cases, 1) the cells that could not be sent out can be deleted, 2) the unsent cells can be sent out after their best-before slot while maintaining the peak cell rate (which means that an unrecoverable delay has been introduced), or 3) the unsent cells can be sent out after their best-before slot while violating the peak cell rate for succeeding cells in order to recover the delay.

The best-before lists will probably (in normal cases and in low load situations) disappear before the window has reached the start slot of these lists. They are only read in emergency cases in order to guarantee the sustainable cell rates (or actually minimum cell rates) of the connections.

Figure 5:
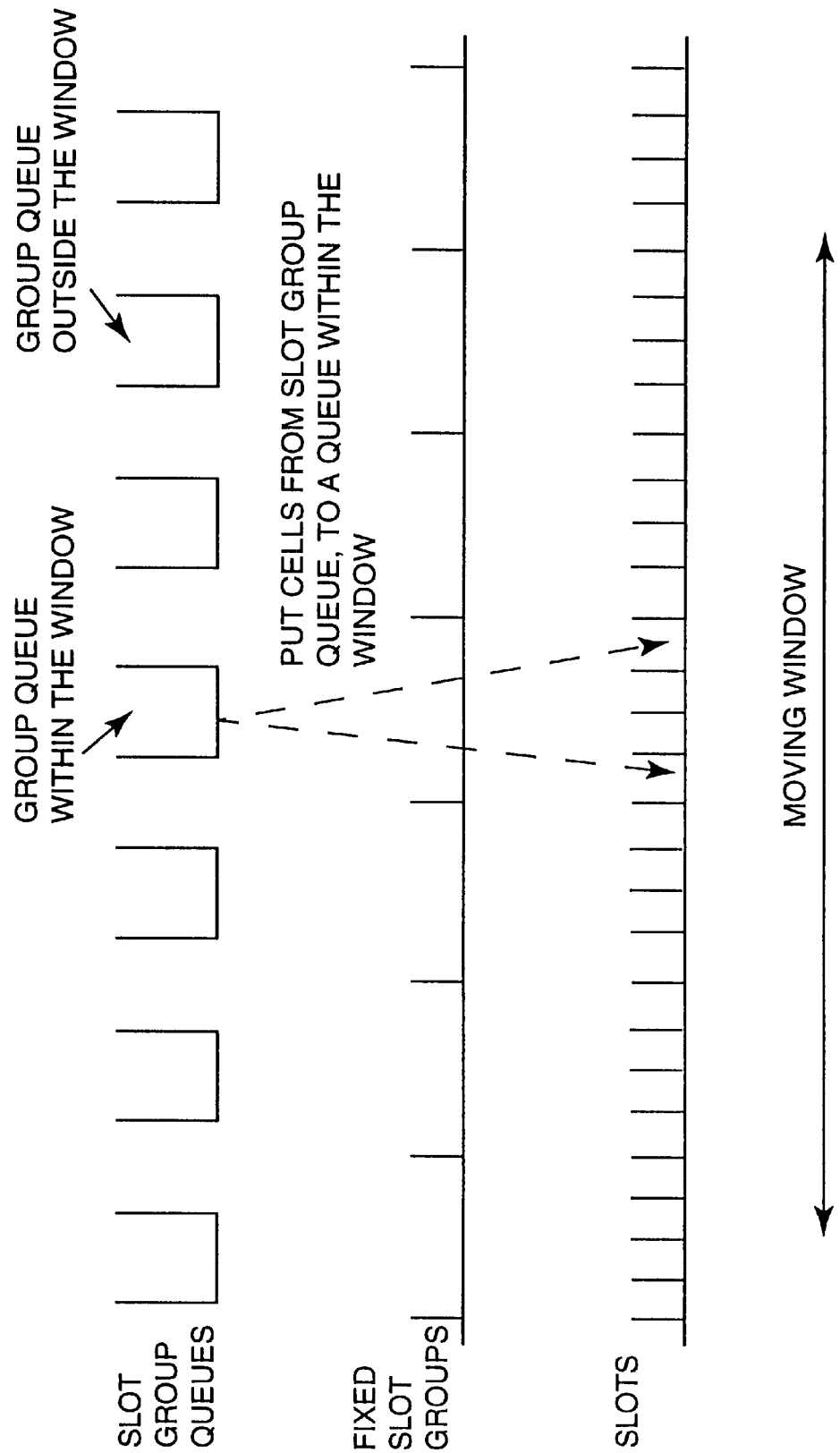
FIG. 5 is an example method of handling slot groups according to one example aspect of the invention.

The present invention also contemplates an extended window size as an alternative to the above-described fixed length embodiments. For very bursty connections with low sustainable cell rates, for example, the best-before slot may exist far beyond the current time window. This may also be the case if ABR connections should be shaped with respect to MCR. To solve this, the time slots may be grouped into groups of e.g., 128 slots. These groups are fixed, i.e., they do not move as the time window. Each group of slots has a queue, in which pointers to cells that are to be scheduled within this group are stored. These pointers could be both earliest slot and best-before entries. When the time window moves along, and has completely covered a group, the cells in the queue for this group are distributed to their correct position within the window. As shown in FIG. 5, each cell interval, one cell from the group queue is placed within the window. It may happen (but probably very rarely) that there are more cells in a group queue than the size of a group (e.g., 128 ). This means that when the window has moved over the next group, there are still cells from the previous group queue that have not yet been placed. In this case, the two queues are concatenated with the oldest queue first. The mean size of the group queues are probably far lower than the size of the window.

When a cell is scheduled, it is placed in the correct group queue, unless it can be put directly within the time window. Most cells will be put directly in the time window, but some best-before entries may be in the group queues. However, a best-before entry is removed when the cell is sent out, so the best-before entries in the group queues may never have to be inserted in the time window queues.

It seems reasonable to have the same number of groups as the size of the time window since the corresponding data structures may be easier to define. With the figures indicated earlier, this would mean 512 groups of 128 slots, i.e., a total of 16 k slots. This corresponds to about 11 ms at 622 Mbit/s, i.e., a cell or best-before slot can be scheduled 11 ms into the future, which corresponds to a lowest rate of 34 kbit/s. If this is not enough, the same mechanism can be used one level up by defining super groups of e.g., 128 groups. When the group window (size 512*128) has covered a complete super group, the cells in the super group queue are put into group queues. With 512 super groups, it is possible to schedule a cell 5.7 s into the future, which corresponds to 74 bit/s. However, in the following sections, no super groups are assumed.

The shaper 42 and can make use of two classes of data structures: 1) data per slot within the window and per group queue (this structure is addressed by the slot number); and 2) data per cell, i.e., links within the queues (this structure is addressed by the connection number, since only one cell exists per connection in the table).

In addition, there is also other data per connection that is used when an earliest and best-before slot is calculated, and for maintaining the linked list of cells for this connection. A microprocessor (not shown), for example, will write parameters in the channel table (such as peak cell rate, etc.) when a connection is set up.

Figure 6:
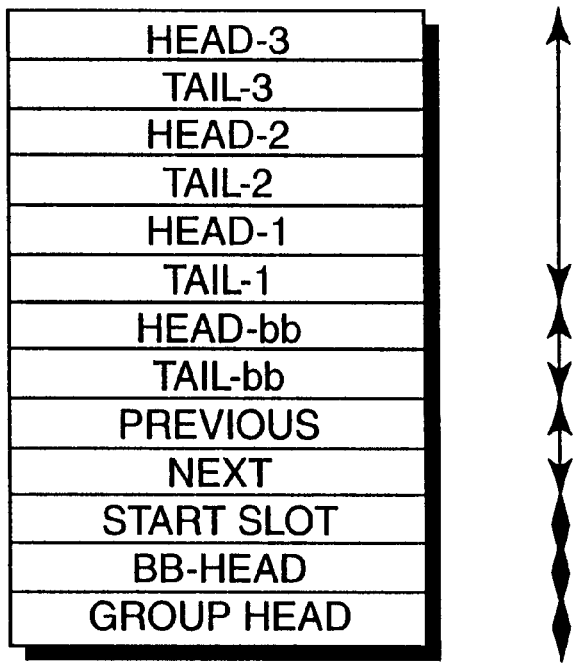
FIG. 6 is an example of a slot data structure according to the invention.

An example slot structure is shown in FIG. 6, and contains the following information:

1. A Head-pointer to the first cell in a priority queue. There is one Head-pointer for each priority queue, e.g., three priorities.
2. A tail-pointer to the first cell in a priority queue. There is one Tail-pointer for each priority queue, e.g., three priorities.

3. A Head-pointer to the first cell in the best-before list for the slot.
4. A Previous-pointer to another slot that has the same start-slot as the current slot. If the slot is the first in a best-before list, this pointer points to the start slot itself, in which case a special marker in the pointer is set.
5. A Next-pointer to another slot that has the same start-slot as the current slot. If the slot is the last in a best-before list, this pointer points to the start slot itself, in which case a special marker in the pointer is set.
6. A Start-slot pointer to the start slot for the current slot. The start slot is the slot that is located "n" slots earlier than the current slot, where "n" is the length of the best-before list of this slot.
7. A Best-Before-Head pointer to the first slot in which the Start-Slot is the current slot.
8. A Group-Head pointer to the first cell in a group queue. (The last item is not strictly related to the slot. It is put here for practical reasons, and could be viewed as an independent structure.).

Figure 7:
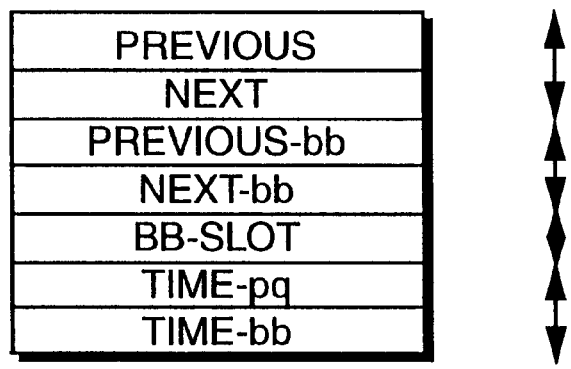
FIG. 7 is another example of a slot data structure according to the invention.

An example cell structure is shown in FIG. 7, and contains the following information:

1. A Previous-pointer to a cell that is linked into the same priority queue. If this cell is the last in a queue, this pointer points to the priority queue, in which case the pointer contains a special marker (e.g., a special bit is set). If the cell is stored in a group queue, this points to the previous cell in that queue.
2. A Next-pointer to a cell that is linked into the same priority queue. If this cell is the first in a queue, this pointer points to the priority queue, in which case the pointer contains a special marker (e.g., a special bit is set). If the cell is stored in a group queue, this points to the previous cell in that queue.
3. A Previous best-before pointer to a cell that is linked into the same best-before queue. If this cell is the last in a queue, this pointer points to the slot structure, in which case the pointer contains a special marker (e.g., a special bit is set). If the cell is stored in a group queue, this points to the next cell in that queue.
4. A Next best-before pointer to a cell that is linked into the same best-before queue. If this cell is the first in a queue, this pointer points to the slot structure, in which case the pointer contains a special marker (e.g., a special bit is set). If the cell is stored in a group queue, this points to the next cell in that queue.
5. A Best-Before slot pointer to the corresponding best-before slot for the cell.
6. A Time Priority Queue value. This is used when a connection is put in a group-queue. The time value indicates the priority queue (and hence slot number) in which this connection should be stored when it is moved from the group-queue.
7. A Time Best-Before value. This is used when a connection is put in a group-queue. The time value indicates the best-before list (and hence slot number) in which this connection should be stored when it is moved from the group-queue.

The cell structures shown in FIG. 7 can be put into group queues two different times. First, the cell is queued if its best-before slot is beyond the current window. Second, the cell is queued if the priority queue is beyond the window. A special marker bit in the pointers in the group queue indicates if the cell pointed to shall be inserted in a priority queue or in a best-before list.

FIGS. 8a–8d show how each type of queue or list is organized.

Figure 8A:
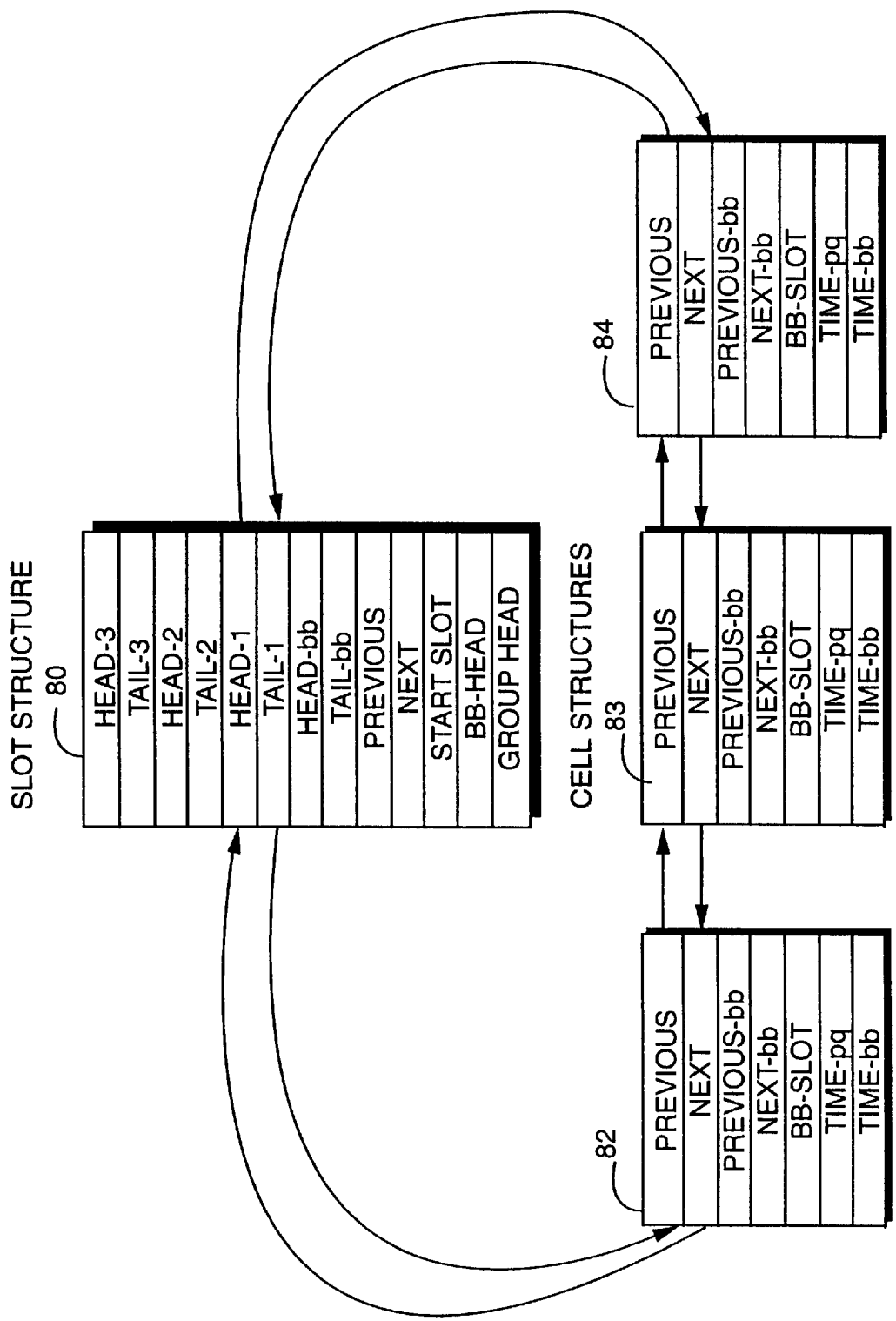
FIGS. 8a–8d illustrate an example organization of each type of queue or list according to the invention, including.

FIG. 8a shows a slot structure 80 having a format similar to the shown and described with respect to FIG. 6. Included in the slot structure 80 are a number of cell structures 82–84, such as are shown and described with respect to FIG. 7. FIG. 8a illustrates the pointers that may exist within a slot structure 80, and specifically within one of the priority queues, such as priority 1, priority 2, or priority 3 of FIG. 3. FIG. 8a may show, for example, the priority 1 queue of FIG. 3, with each of the cell structures 82–84 corresponding to the buffer positions 30a–30c of the priority one queue. As shown in FIG. 3, cell buffer 30a is linked sequentially to cell buffers 30b and 30c, and finally to the head and tail positions of the slot k. Correspondingly, in FIG. 8a, the detail of these pointers is illustrated. Specifically, the previous positions in each of the cell structures 82–84 are linked to the tail one position of slot structure 80 and the next cell positions of the cell structures 82–84 are linked sequentially to the head one position of slot structure 80. Of course, if cell structures 82–84 of FIG. 8a corresponded to the priority 2 position of FIG. 3, the previous and next positions of the cell structures 82–84 would link with the head to and tail to positions of slot structure 80, rather than the head one and tail one positions shown. FIG. 8a thus shows the type of g that exist within one of the priority queues in one of the slots within the window 20 of FIG. 3.

Figure 8B:
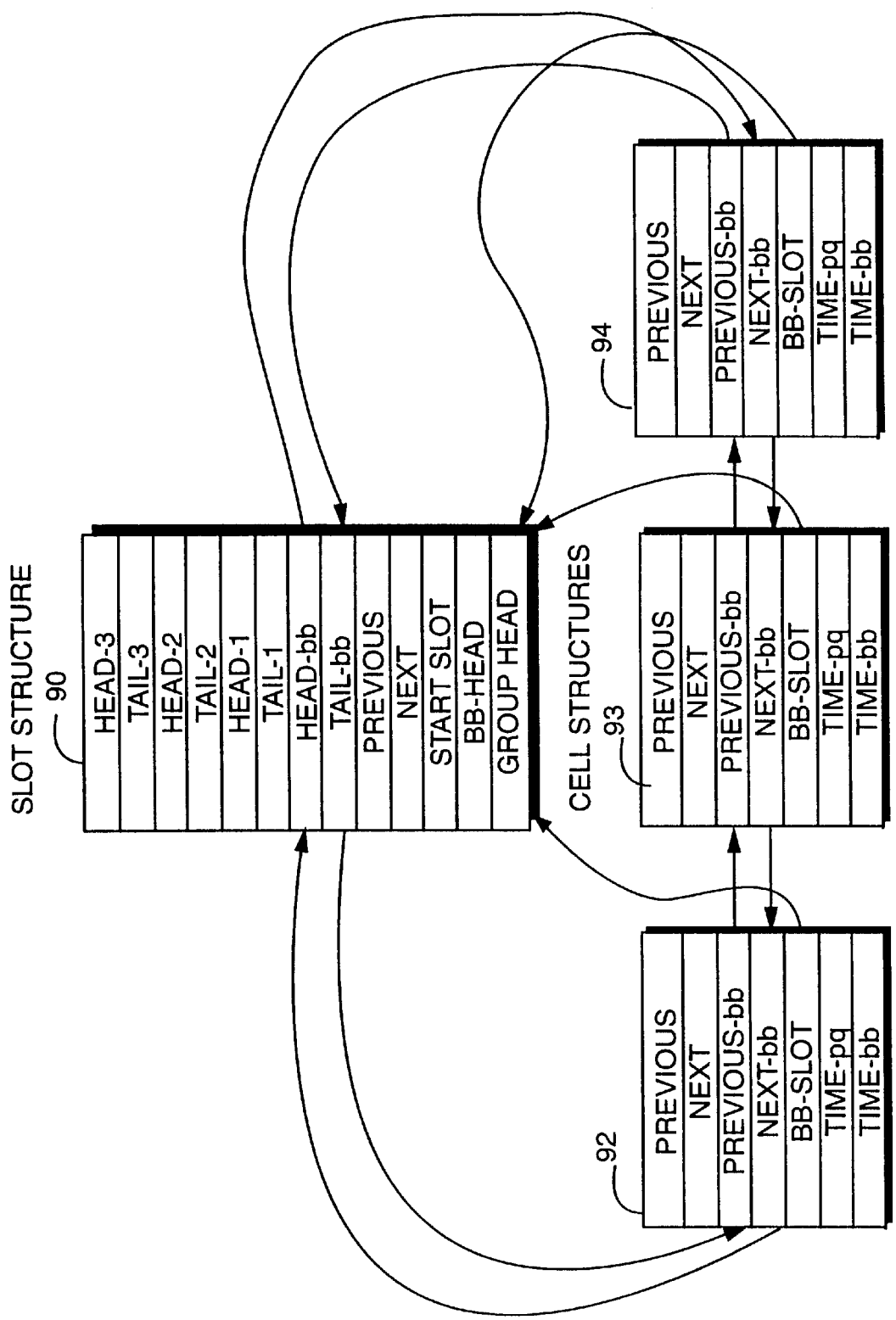

FIG. 8b illustrates pointers that exist in a best-before list of one of the slots of, for example, FIG. 3. As shown in FIG. 3, slot k has a best-before list portion in which cell positions 30a, 30b, 30c are linked to each other and to a head pointer of the slot k. Correspondingly, FIG. 8b illustrates slot structure 90 (corresponding to slot k) and cell structures 92–94, which could correspond to the cell positions 30a–30c of FIG. 3. The cell structures 92–94 of FIG. 8b include buffer positions identifying previous best-before lists and next best-before lists, as described with respect to FIG. 7 above. As shown in FIG. 8b, these previous best-before portions of the cell structures 92–94 are linked together sequentially, and are also linked to the tail best-before list portion of slot structure 90. Pointers also exist between the next best-before portions of the cell structures 92–94 to the head best before identifier of the slot structure 90. Corresponding arrangements and pointers are shown in FIG. 3 with respect to the cells 30a–30c and the "h" pointer of slot k. As is also shown in FIG. 8b, each of the cell structures 92–94 have identifiers for their corresponding best-before slots (as described above with respect to FIG. 7) and these best-before slots include unidirectional pointers to the slot structure 90.

Figure 8C:
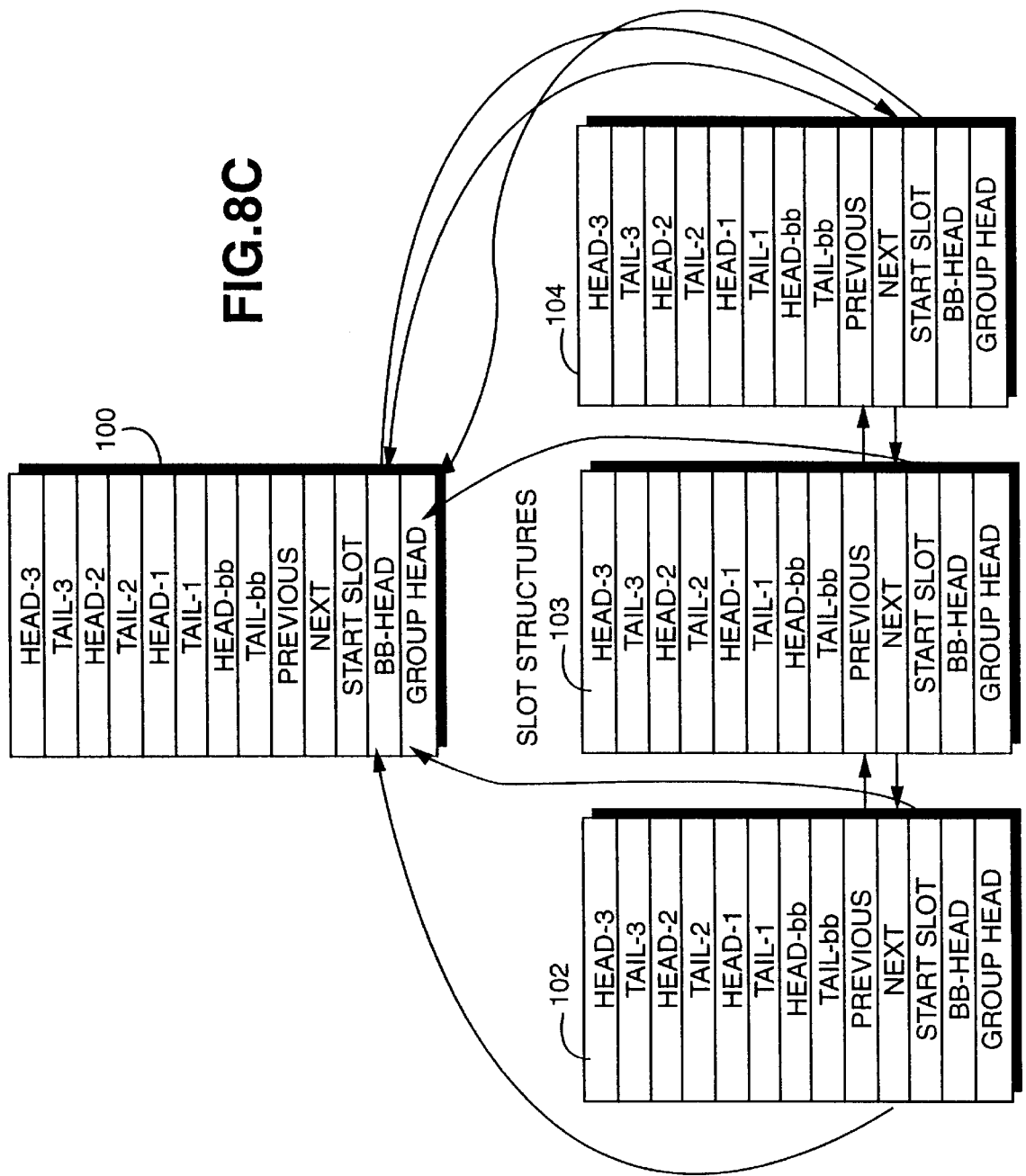

FIG. 8c illustrates a slot structure 100 indicating the pointers in a list of best-before lists. The corresponding list of pointers to the best-before list is also shown for each of the slots in FIG. 3 at the bottom of each of the slots k through k+3. In the case of FIG. 8c, the slot structure 100 corresponds to slot k, and the buffers 30a–30c contain the slot structures 102–104. As shown in FIG. 8c, the slot structures 102–103 contain previous and next positions, with the previous positions linked to the best-before head pointer of slot 100, and the next positions of slot structures 102–104 linked sequentially to the best-before head of slot 100 as well. Further, each of the start slots of the slot structures 102–104 are linked unidirectionally to the slot 100. Corresponding pointers can be seen in FIG. 3 between the list of pointers to best-before lists positions 30a–30c and the slot k.

Figure 8D:
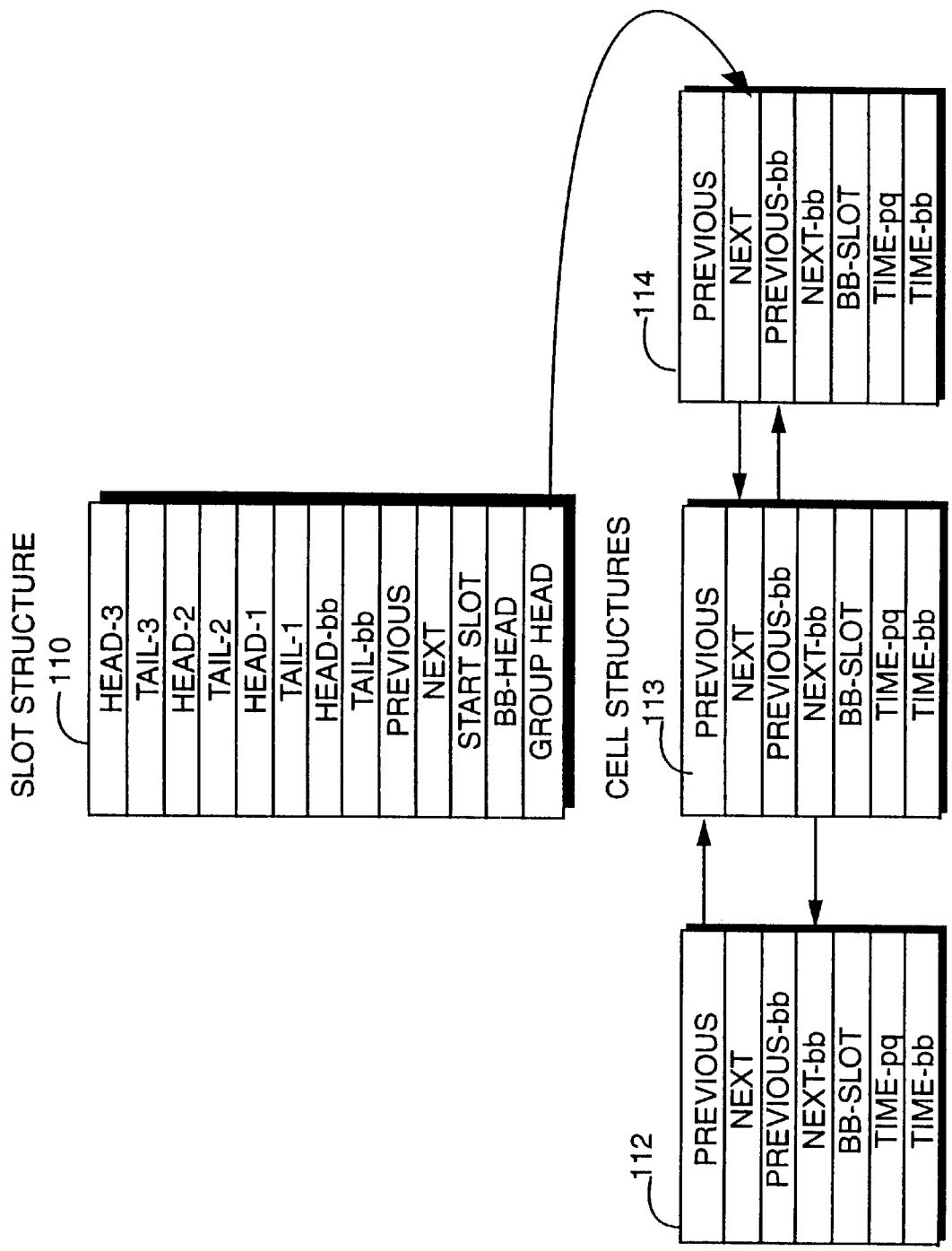

Finally, FIG. 8d illustrates pointers in a group queue, such as is described with respect to FIG. 5. In FIG. 8d, the slot structure 110 has a pointer from the group head position to the next position of cell structure 114, which in turn links to the next position of cell structure 113. Cell structure 112 is linked to cell structure 113 via the previous positions of each of the respective cell structures and via the next best-before list positions of each of the respective cell structures. Finally, cell structure 113 points to cell structure 114 via the previous best-before list positions.

Cell structures 112–114 are chosen to represent three different types of cells vis-a-vis their position within a slot group. Cell structure 112 is a cell having a priority queue lying within the slot group, as shown in FIG. 5. Its time Priority Queue shows which queue the cell shall be inserted in.

Cell structure 113 is a cell having a best-before slot lying within the slot group. Its Time best-before shows which queue the cell shall be inserted in.

Cell structure 114 is a cell having a priority queue lying within the slot group. Its Time Priority Queue shows which queue the cell shall be inserted in.

In a preferred embodiment, the pointers to entries in a group queue has a special bit that indicates if the next cell structure shall be put in a priority queue or in a best-before list.

Although slots 80, 90, 100, and 110 as shown individually in FIGS. 8a–8d. These slots can, of course, be the same slot with the pointers shown (or additional pointers or links). For simplicity and clarity in stating the functions of the slots, the FIGS. 8a–8d are shown individually.

Referring again to FIG. 2, one can now appreciate that each transmission cycle, one slot will provide one cell for transmission. During the transmission cycle for any one cell slot the shaper is prioritizing and queuing these cell transmissions. The following actions may be taken be the shaper 42:

a) Receive a cell from the switch network 12 or the User Premises (first cell of a connection), and schedule it in an earliest and best before queue (or in a group queue);

b) Read the next cell to send out, and schedule the next cell of the same connection;

c) Move one or two entries from the group queue to the correct queues within the window.

These actions are described in more detail in the next sections.

a) Receive A Cell From The Switch

When a cell is received, the shaper first determines if the assigned connection is already present in the scheduling queues. It does this by checking the previous-pointer, i.e., a nil pointer (a pointer with a reserved value) indicates that this connection has no cell in the scheduler. If it is present, the cell is put at the end of the per-VC queue (this queue is not shown in the illustrated data structures).

If the connection is not present, the shaper calculates a priority queue and a best-before slot (based on the traffic parameters of the connection (such as PCR, SCR, maximum burst size, etc.).

If the priority queue is within the window, the cell structure is inserted at the tail of the priority queue (pointers are written and changed). If the priority queue is outside the window, the cell structure is inserted at the head of the group queue that contains the correct slot. The pointers to this structure will indicate that it should be inserted in a priority queue.

If the best-before slot is within the window, the cell structure is inserted at the tail of the best-before list at the best-before slot. This means that the length of this list increases, so the start slot of it must be adjusted. The best-before list is removed from the current list of bb-lists (using the Next-BB and Previous-BB pointers). The best-before list is then inserted at the tail of the list of bb-list at the next lower slot. This is found by using the Start-Slot pointer, and decreasing this by one. If the best-before slot is outside the window, the cell structure is inserted at the head of the group queue that contains the correct slot. The pointers to this structure will indicate that it should be inserted in a best-before list.

b) Read The Next Cell To Send Out

When a cell shall be sent out, the shaper first determine if the list of BB-lists at the current slot is empty (the BB-head pointer should be set to the nil pointer value).

If this is the case, the highest, non-empty priority queue is selected, and the first cell entry is read (using the Head-pointer). A cell from the corresponding per-VC queue is sent out. The cell entry is removed from the priority queue and from the best-before list. The best-before list will decrease in size, which means that the start-slot must be changed in the same way as when a cell entry was stored. It may happen that the best-before slot is in a group queue, in which case, the cell entry is just removed from the group queue.

If the list of BB-lists is not empty, a cell is instead taken from the bb-list pointed to. The cell entry is removed from the bb-list and the start-slot is adjusted as described above. The cell is also removed from the priority queue to which it belongs.

If there are several best-before lists in a list of bb-lists, it is not possible to empty all lists before their best-before times. In that case, some of the cells have to be sent out later and an alarm should be given to the microprocessor that controls the shaper.

When a cell has been sent out, the shaper determines if there are more cells in the per-VC queue. If so, a new cell entry for the same connection is introduced in the queues the same way as when a cell arrives from the switch core.

If there are no more cells in the per-VC queue, the Previous pointer is set to nil (a special value on the pointer).

c) Move An Entry From The Group Queue

When a window passes along and covers a complete slot group, the cell entries that are stored in the group queue are read and inserted in the correct priority queue and/or best-before list. A marker in the pointer to the cell entry indicates into which type of queue the cell should be inserted. One or two entries are read every slot. The length of a group queue is probably much less than the size of the slot group, so there is only a very small possibility that a group queue can not be emptied within the time limit. In that case, the microprocessor should be informed.

d) Using The Shaper To Control Maximum Switch Delay

The shaper mechanism described above can be used to control the maximum delay of each cell through the switch. For that purpose, each cell must be time stamped when it enters the switch from the external link. The time stamp is the value of a slot counter that is distributed to all ingress switch ports. An ingress switch port terminates the external link, extracts cells, buffers them and sends them through the switch fabric to the egress switch port where the shaper is located.

When a cell arrives to the shaper, it has experienced a certain delay that depends on the current buffer status. When a best-before slot shall be calculated, the time stamp of the cell is read out and the maximum allowed delay of that connection is added to the time stamp. The result gives the best-before slot, and by this way, the maximum delay through the switch can be controlled.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An ATM apparatus, comprising:
   an input to receive cells for transmission as output slots onto switched network connections;
   a shaper for assigning each received cell into both a priority queue identifying an earliest transmission slot for each cell and a best-before queue mandating a latest possible transmission slot for each cell; and
   a port to output the cells in the output slots no earlier than assigned by the priority queue and no later than assigned by the best-before queue.

2. An ATM apparatus according to claim 1, wherein:
   the shaper further performs said assigning based on a predefined window-length of cell slots.

3. An ATM apparatus according to claim 2, wherein:
   the shaper assigns each received cell within the window-length of cell slots.

4. An ATM apparatus according to claim 2, wherein:
   the shaper maintains a best-before list for each cell slot in the window-length of cell slots, the best-before list for each cell slot including best-before cell slots for each of the cells in said each cell slot, and said shaper linking the cells in said each said cell slot with the best-before cell slots.

5. An ATM apparatus according to claim 4, wherein:
   the shaper maintains a pointer list for each cell slot in the window-length of cell slots, the pointer list for each cell slot including pointers to all best-before lists further in time down the window-length of cell slots.

6. An ATM apparatus according to claim 5, wherein:
   the shaper assigns a specific slot number to each cell slot in the window-length of cell slots with a current cell slot having a specific slot number of one and each subsequent cell slot having a specific slot number incrementally increased by one through the last cell slot in the window-length of cell slots;
   the shaper assigns a specific cell number to each cell slot in the window-length of cell slots based on the current number of cells in the best-before list of said each cell slot; and
   the shaper maintains the pointer list with pointers to all cell slots further in time down the window-length of cell slots, the pointers calculated by subtracting:
      cell numbers corresponding to the number of cells contained in the best-before lists of said cell slots further in time down the window-length of cell slots from
      slot numbers corresponding to each of said cell slots further in time down the window-length of cell slots.

7. An ATM apparatus according to claim 2, wherein said shaper further fixes groups of output slots into slot groups and temporarily holds cells that fall within the slot groups but outside the window-length of cell slots until the window-length covers said temporarily held cells, whereupon said shaper then assigns said temporarily held cells.

8. An ATM apparatus according to claim 1, wherein:
   a new cell slot is added to the window-length of cell slots each time an output slot is output by the port.

9. An ATM apparatus according to claim 1, wherein:
   the shaper assigns each received cell into the best-before queue based on a peak cell rate for one of the switched network connections corresponding to said each cell.

10. An ATM apparatus according to claim 1, wherein:
    the shaper assigns each received cell into the best-before queue based on a sustainable cell rate for one of the switched network connections corresponding to said each cell.

11. An ATM apparatus according to claim 1, wherein:
    the shaper assigns each received cell into the best-before queue based on a sustainable cell rate for one of the switched network connections corresponding to said each cell.

12. An ATM apparatus according to claim 1, wherein said shaper determines whether any cell slot in the best-before queue is a current cell slot and then selects for output either a prioritized cell from said priority queue or a cell associated with said best-before queue.

13. An ATM apparatus according to claim 12, wherein said shaper maintains best-before lists associated with corresponding cell slots including the current cell slot a and predetermined number of next consecutive cell slots, each best-before list identifying cells to be transmitted before the corresponding cell slot, and wherein:
   a) when said shaper selects the cell associated with the best-before cell slot identifying said current slot, said selected cell is removed from the best-before queue and priority queue.

14. An ATM apparatus according to claim 13, wherein:
   b) when said shaper selects the priority cell from said priority queues, said selected priority cell is removed from the best-before queue and priority queue.

15. An ATM apparatus according to claim 14, wherein:
   said shaper further maintains a list of best-before lists for the predetermined number of next consecutive cell slots, and wherein, when a cell is removed from an assigned best-before list, that assigned best-before list is removed from its current list of best-before lists and inserted in the next consecutive list of best-before lists.

16. An ATM apparatus according to claim 1, wherein the shaper guarantees a certain minimum delay between the input and the port.

17. A memory containing information identifying:
   a series of ATM cell slots having associated cell slot numbers from one to N corresponding to a transmission time position of said cell slots in a cell slot window;
   each said cell slot including:
      an earliest possible list containing information identifying cells prioritized to be transmitted in or before said cell slot,
      a best-before list containing information identifying cells mandated to be transmitted in or before said cell slot, and containing a cell number equal to the number of cells contained in the best-before list, and
      a pointer list containing information corresponding to all cell slots further in time in said transmission time position, said pointer list information including, for each said further cell slot, a pointer equal to the cell number for said further cell slot subtracted from the slot number for said further cell slot.

18. A method, comprising:
   receiving cells for transmission as output slots onto switched network connections;
   assigning each received cell into both a priority queue identifying an earliest transmission slot for each cell and a best-before queue mandating a latest possible transmission slot for each cell; and
   outputting the cells in the output slots no earlier than assigned by the priority queue and no later than assigned by the best-before queue.

19. A method according to claim 18, wherein:

the step of assigning is based on a predefined window-length of cell slots.

20. A method according to claim 19, further including the step of:

adding a new cell slot to the window-length of cell slots each time an output slot is output by the port.

21. A method according to claim 19, further including the step of:

assigning each received cell to a cell slot within the window-length of cell slots.

22. A method according to claim 19, further including the steps of:

maintaining a best-before list for each cell slot in the window-length of cell slots, the best-before list for each cell slot including best-before cell slots for each of the cells in said each cell slot, and linking the cells in said each said cell slot with the best-before cell slots.

23. A method according to claim 22, further including the step of:

maintaining a pointer list for each cell slot in the window-length of cell slots, the pointer list for each cell slot including pointers to all best-before lists further in time down the window-length of cell slots.

24. A method according to claim 23, further including the steps of:

assigning a specific slot number to each cell slot in the window-length of cell slots with a current cell slot having a specific slot number of one and each subsequent cell slot having a specific slot number incrementally increased by one through the last cell slot in the window-length of cell slots;

assigning a specific cell number to each cell slot in the window-length of cell slots based on the current number of cells in the best-before list of said each cell slot; and maintaining the pointer list with pointers to all cell slots further in time down the window-length of cell slots, the pointers calculated by subtracting:

cell numbers corresponding to the number of cells contained in the best-before lists of said cell slots further in time down the window-length of cell slots from slot numbers corresponding to each of said cell slots further in time down the window-length of cell slots.

25. A method according to claim 18, wherein:

the step of assigning is based on a peak cell rate for one of the switched network connections corresponding to said each cell.

26. A method according to claim 18, wherein:

the step of assigning is based on a sustainable cell rate for one of the switched network connections corresponding to said each cell.

27. A method according to claim 18, wherein:

the step of assigning is based on a peak cell rate and a sustainable cell rate for one of the switched network connections corresponding to said each cell.

* * * * *